United States Patent [19]

Twachtmann

[11] Patent Number: 5,345,325
[45] Date of Patent: Sep. 6, 1994

[54] SCULPTURED LIGHT DIFFUSER FOR ENHANCING BRIGHTNESS AND UNIFORMITY OF LIQUID CRYSTAL DISPLAYS

[75] Inventor: Todd Twachtmann, Marion, Iowa

[73] Assignee: Rockwell International Corporation, Seal Beach, Calif.

[21] Appl. No.: 40,941

[22] Filed: Mar. 31, 1993

[51] Int. Cl.⁵ .......................................... G02F 1/1335
[52] U.S. Cl. ......................................... 359/69; 359/48
[58] Field of Search ........................ 359/48, 49, 50, 69

[56] References Cited

U.S. PATENT DOCUMENTS 4,059,916 11/1977 Tachihara et al. ................... 359/48
4,659,183 4/1987 Suzawa ................................ 359/69

*Primary Examiner*—William L. Sikes
*Assistant Examiner*—Huy Mai
*Attorney, Agent, or Firm*—Gregory G. Williams; M. Lee Murrah; H. Fredrick Hamann

[57] ABSTRACT

A liquid crystal display having enhanced viewing brightness and brightness uniformity which utilizes a sculptured diffuser having a varied thickness characteristic where the thickness of the diffuser is reduced in areas where brightness of the display device is desired.

4 Claims, 1 Drawing Sheet

SCULPTURED LIGHT DIFFUSER FOR ENHANCING BRIGHTNESS AND UNIFORMITY OF LIQUID CRYSTAL DISPLAYS

FIELD OF THE INVENTION

The present invention generally relates to visual display devices; and more particularly, relates to liquid crystal displays having a backlight; and even more particularly, concerns an apparatus for enhancing the overall brightness and uniformity of light across the viewing surface of a backlighted liquid crystal display panel.

BACKGROUND OF THE INVENTION

With the current trends in the avionics business toward improving ergonomics and image quality of displays, it is becoming increasingly important to provide a liquid crystal display with a uniform brightness across the display panel.

Basically, backlighted liquid crystal displays utilize a backlight to generate a white light which is filtered by a liquid crystal filter to create an image. The backlight is frequently an incandescent or fluorescent lamp which typically is placed between a diffuser and a back reflector. The area on the diffuser centered in front of the lamp is typically brighter than the area of the diffuser around its edges. The bright spots have been attenuated in the past, by methods such as placing light absorbing dots on the lamp side of the diffuser adjacent the lamps.

While this design, or variations of it, have enjoyed significant use in the past, it does have several serious drawbacks. A major drawback with the light absorptive dots placed on the lamp side of the diffuser is that it causes an overall reduction in the brightness of the liquid crystal display panel. Another problem with such a design is that the absorptive dots typically absorb heat as well as light and thereby create a panel with a higher overall operating temperature.

Consequently, there exists a need for an improvement and advancements in the design of liquid crystal display panels which provide for a more uniform brightness across the liquid crystal panel with concomitant increase in overall panel brightness without any increase in the lamp power or operating temperature.

SUMMARY OF THE INVENTION

It is an object of the present invention to provide a liquid crystal display having more uniform light distribution across the display viewing surface.

It is a feature of the present invention to include a sculptured light diffuser where the light diffuser has a smaller thickness at its periphery with respect to the thickness at its center.

It is an advantage of the present invention to enhance the uniformity of light across liquid crystal panel by reducing the attenuation of light associated by the diffuser at the diffuser periphery.

The present invention provides a liquid crystal display device which is designed to satisfy the aforementioned needs, produce the earlier propounded objects, include the above described features, and achieve the already articulated advantages. The invention is carried out in a "non-rectangular diffuser cross section" approach, in the sense that the normal diffuser having a rectangular cross section throughout is eliminated. Instead, a sculptured diffuser having a lesser thickness in areas having a need for higher transmittance of light is utilized.

Accordingly, the present invention relates to a liquid crystal display panel where a back lamp is provided with a reflector assembly for reflecting light toward the viewing surface and a light diffuser having a sculptured cross section where the periphery of the diffuser has a narrower thickness than does the center of the diffuser, thereby providing for increasing the light transmitted around the periphery of the diffuser, and thereby increasing the overall brightness of the display and the uniformity.

BRIEF DESCRIPTION OF THE DRAWINGS

The invention will be better understood by a reading of the detailed description in conjunction with the appended drawings in which.

DETAILED DESCRIPTION

Figure 1:
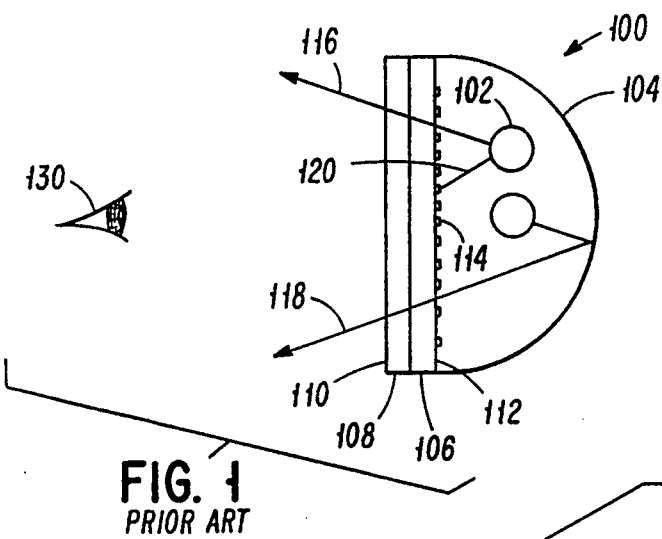
FIG. 1 is a schematic cross sectional representation of a liquid crystal display, of the prior art which utilizes absorptive dots placed on the light side of the diffuser.

Now referring to the drawings, and more particularly to FIG. 1, there is shown a liquid crystal display, generally designated 100, of the prior art. Display 100 is shown having a backlight 102 therein. Also shown is a reflector assembly 104 for reflecting light rays emanating from the back side of backlight 102. A light diffuser 106, having a lamp side 112 thereon, is disposed between backlight 102 and liquid crystal filter 108 which has a viewing surface 110 thereon. A plurality of light absorptive dots 114 is placed on the lamp side 112 of diffuser 106. Light ray 116 emanates from backlight 102 and proceeds through the diffuser and liquid crystal filter 108 and extends generally toward the viewer 130. Light ray 118 is shown emanating from the back side of backlight 102 and reflecting off of reflector assembly 104 and thereon extending through diffuser 106 and liquid crystal filter 108 in a direction generally directed toward the viewer 130. Light ray 120 is shown emanating from backlight 102 and being absorbed by a light absorptive dot 114 on the lamp side of diffuser 106.

Figure 2:
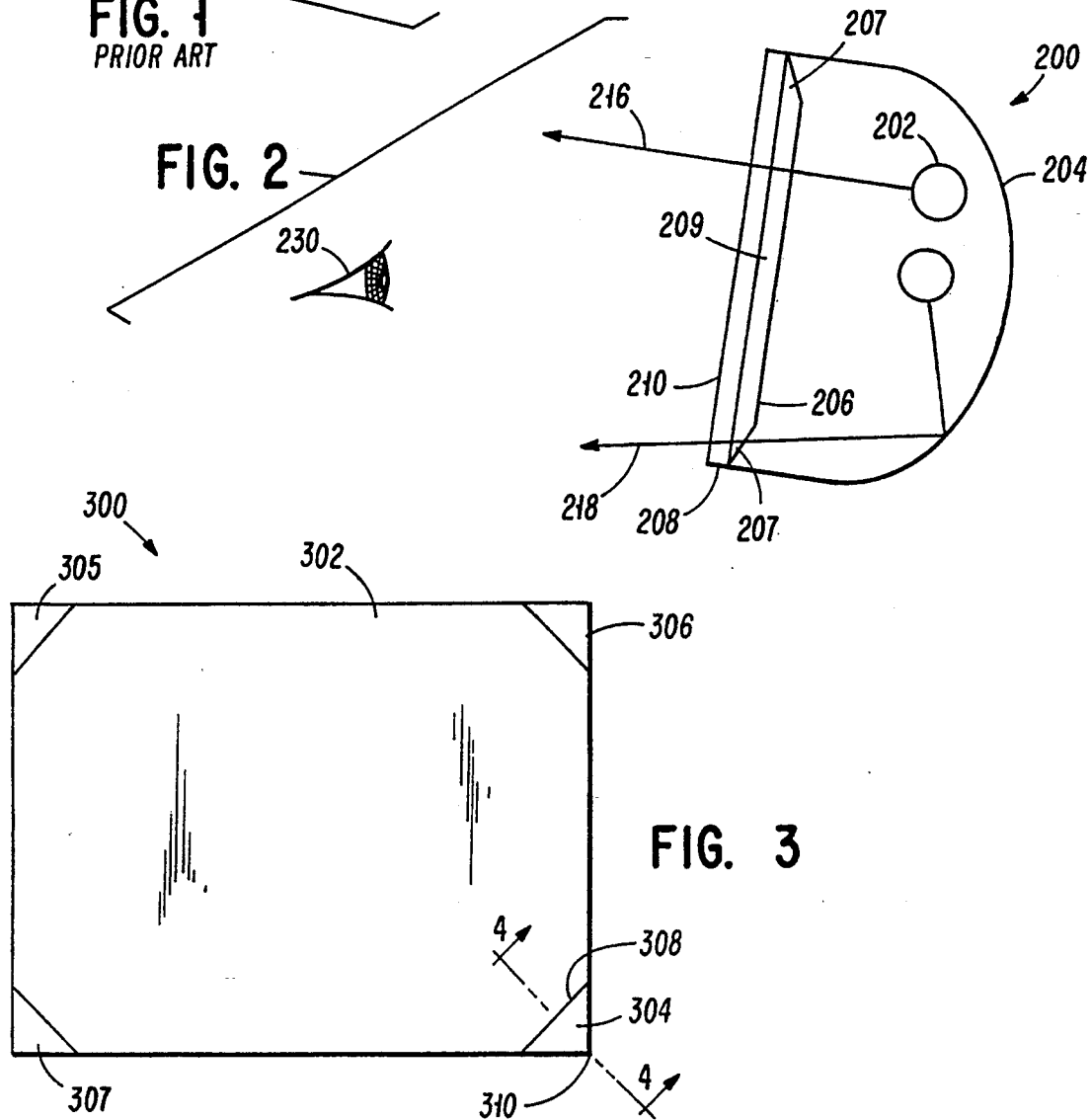
FIG. 2 is a schematic cross sectional representation of the liquid crystal display of the present invention which utilizes a sculptured frustum shaped diffuser where the diffuser has a narrower thickness around its periphery in comparison to the thickness at the diffuser center.

Now referring to FIG. 2, there is shown a liquid crystal display, generally designated 200, of the present invention. This display 200 is shown having a backlight 202, which is preferably a fluorescent tube, and a reflector assembly 204 for reflecting light incident thereon in a direction toward the viewer 230. A frustum shaped light diffuser 206 having peripheral areas 207 of lesser thickness, is interposed between the backlight 202 and the liquid crystal filter 208 which has a viewing surface 210 thereon.

The light diffuser 206 is preferably but not limited to an acrylic, milky white translucent material, which is well known in the industry however, it is preferred that the thickness of the diffuser 206 is sculptured so that the areas of the viewing surface 210 as seen from the viewer 230 which would typically be less bright, such as the periphery of the viewing surface 210, have a smaller thickness in comparison to the thickness at the center 209. While the examples herein are focused on sculptured areas, or thinner areas, around the periphery of the viewing surface, the present invention applies to providing a thinner diffuser for any area in which an increase in brightness is desired.

Light ray 216 is shown emanating from backlight 202 and progressing through the diffuser 206 at its thicker portion near the center 209 of diffuser 206. Light ray 218 is shown emanating from backlight 202 and reflecting off of the reflector assembly 204 and passing through the diffuser 206 at the region 207 where the thickness of the diffuser 206 is reduced.

The enhancement of the overall brightness of the liquid crystal display 200 is achieved when the light ray 218 is allowed to pass through a narrower amount of diffuser and thereby reducing the amount of light attenuation associated with transmitting through the diffuser.

Figure 3:
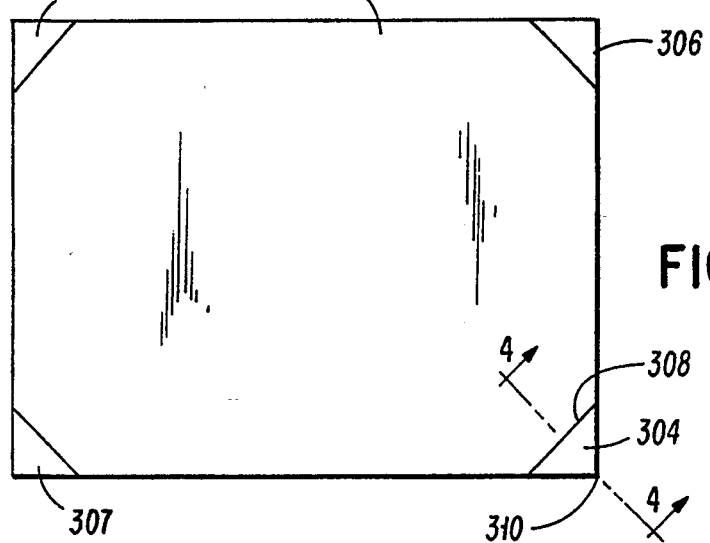
FIG. 3 is a top view of the diffuser of the present invention, which shows the corner areas where the thickness is thinner than the thickness in the center.

Now referring to FIG. 3, there is shown another embodiment of the present invention having a sculptured diffuser, generally designated 300 having a central full thickness region 302 therein. Also shown are corner areas 304, 305, 306, and 307 having reduced diffuser thicknesses in an attempt to increase the transmittance of light therethrough. Corner area 304 is shown extending from line 308 to point 310. The thickness of the diffuser in corner area 304 tapers from a maximum at line 308 down to a minimum at point 310. Corner areas 304, 305, 306, and 307 can be milled from a planar sheet of acrylic or any other suitable means for creating a sheet having areas of reduced thickness can be substituted. The areas 304, 305, 306, and 307 are disposed in the corners of the diffuser 300. The corners are typically but not limited to an area of a backlit liquid crystal display which have problems with reduced brightness. FIG. 3 also shows section line 4—4 across area 304.

Figure 4:
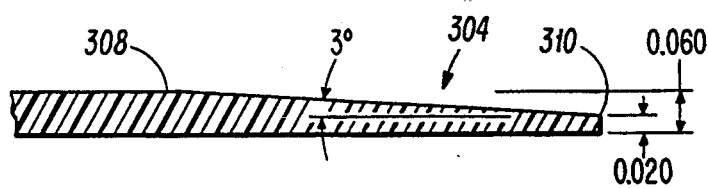
FIG. 4 is a cross sectional view of the diffuser, of the present invention, taken on line 4—4 of FIG. 3 which shows the corner thickness of the diffuser tapering off as radial distance from the center increases.

Now referring to FIG. 4, there is shown a cross-sectional representation, of a segment of the diffuser 300, of FIG. 3 taken along line 4—4 of FIG. 3. There is shown the tapered nature extending from line 308 to point 310. The area disposed between line 308 and point 310 is corner area 304. The shape of area 304 is such that the thickness at point 310 is greater than 0. Any profile or shape of area 304 could be utilized and the shape and profile of area 304 as shown are merely shown for example.

It is thought that the liquid crystal display panel of the present invention and many of its intended advantages will be understood from the foregoing description, and it will be apparent various changes in the form, construction, and arrangement of the parts thereof may be made without departing from the spirit and scope of the invention, or sacrificing all of its material advantages, the forms herein before described being merely preferred or exemplary embodiments thereof.

I claim:

1. A visual display device comprising:
   a visible light source;
   means for reflecting a portion of said visible light in a direction toward a viewer;
   means for filtering said visible light, disposed between said light source and the viewer, so that, said visible light can be transformed into a visual image having predetermined visual characteristics; and,
   means for diffusing said light incident on said means for filtering, said means for diffusing being interposed between said means for filtering and said light source, and said means for diffusing further having a first thickness at a predetermined first area, a second thickness at a predetermined second area;
   whereby, a visual display device, with enhanced overall light brightness, is provided by reducing the attenuation of light caused by the diffuser, at said first area is achieved without a reduction in the overall average light intensity across the display device.

2. A device of claim 1 wherein said first area is an area at the periphery of said means for diffusing and said second area is an area at a central portion of said means for diffusing.

3. A device of claim 2 wherein said first area is a cornet of said means for diffusing.

4. An improved liquid crystal display comprising;
   a fluorescent lamp;
   a reflector;
   a liquid crystal filter;
   a diffuser disposed between said lamp and said liquid filter;
   said diffuser having a frustum shape with a rectangular lamp side and a rectangular filter side, a first trapezoidal shaped side and a second trapezoidal shaped side; and,
   said lamp side having a smaller surface area than said filter side.

* * * * *